United States Patent
Cypher et al.

(10) Patent No.: US 7,962,733 B2
(45) Date of Patent: Jun. 14, 2011

(54) BRANCH PREDICTION MECHANISMS USING MULTIPLE HASH FUNCTIONS

(75) Inventors: Robert E. Cypher, Saratoga, CA (US); Stevan A. Vlaovic, Cupertino, CA (US)

(73) Assignee: Oracle America, Inc., Redwood City, CA (US)

(*) Notice: Subject to any disclaimer, the term of this patent is extended or adjusted under 35 U.S.C. 154(b) by 158 days.

(21) Appl. No.: 12/493,768

(22) Filed: Jun. 29, 2009

(65) Prior Publication Data
US 2009/0265533 A1    Oct. 22, 2009

Related U.S. Application Data

(63) Continuation of application No. 10/821,431, filed on Apr. 9, 2004, now abandoned.

(51) Int. Cl.
*G06F 9/00* (2006.01)
(52) U.S. Cl. ...................................................... 712/239
(58) Field of Classification Search ................... 712/239
See application file for complete search history.

(56) References Cited

OTHER PUBLICATIONS

Jimenez et al.; "Dynamic Branch Prediction with Perceptrons"; 2001; IEEE.*
Loh et al.; "Predicting Conditional Branches With Fusion-Based Hybrid Predictors"; 2002; IEEE.*
Seznec; "Analysis of the O-GEometric History Length branch predictor"; 2005; IEEE.*

* cited by examiner

*Primary Examiner* — Alford W Kindred
*Assistant Examiner* — Benjamin P Geib
(74) *Attorney, Agent, or Firm* — Meyertons, Hood, Kivlin, Kowert & Goetzel, P.C.; Stephen J. Curran

(57) ABSTRACT

In one embodiment, the branch prediction mechanism includes a first storage including a first plurality of locations for storing a first set of partial prediction information. The branch prediction mechanism also includes a second storage including a second plurality of locations for storing a second set of partial prediction information. Further, the branch prediction mechanism includes a control unit that performs a first hash function on input branch information to generate a first index for accessing a selected location within the first storage. The control unit also performs a second hash function on the input branch information to generate a second index for accessing a selected location within the second storage. Lastly, the control unit further provides a prediction value based on corresponding partial prediction information in the selected locations of the first and the second storages.

20 Claims, 3 Drawing Sheets

BRANCH PREDICTION MECHANISMS USING MULTIPLE HASH FUNCTIONS

This application is a continuation of U.S. patent application Ser. No. 10/821,431, entitled "Branch Prediction Scheme Utilizing Multiple Branch Predictors and Multiple Index Hashing Mechanisms for Determining a Final Prediction Based on Intermediaries," filed Apr. 9, 2004 now abandoned.

BACKGROUND OF THE INVENTION

1. Field of the Invention

This invention relates to microprocessors and, more particularly, to branch prediction mechanisms employed by microprocessors.

2. Description of the Related Art

Many high performance pipelined microprocessors maintain their performance by keeping the various pipelines as full as possible. However, certain control transfer instructions may cause various stages within a pipeline to be flushed and the instructions in those stages to be canceled or discarded. One such instruction is a branch instruction. A branch instruction is an instruction which causes subsequent instructions to be fetched from a target address identifying an instruction stream beginning at an arbitrary location in memory. Unconditional branch instructions always branch to the target address, while conditional branch instructions may select either the next sequential address or the target address based on a condition such as the outcome of a prior instruction. Thus, when instructions are prefetched into a processor's instruction-processing pipeline sequentially, and a conditional branch is taken, the contents of early stages of the pipeline may contain instructions that should not be executed but rather should be flushed.

Accordingly, in conjunction with the pre-fetching of instructions, it is generally beneficial to predict whether a conditional branch instruction, when executed, will be taken or not. For this purpose, many pipelined microprocessors employ a branch prediction mechanism.

The branch prediction mechanism may indicate a predicted direction (taken or not-taken) for a branch instruction, allowing subsequent instruction fetching to continue within the predicted instruction stream indicated by the branch prediction. Instructions from the predicted instruction stream may be speculatively and/or executed prior to execution of the branch instruction, and are placed into the instruction-processing pipeline prior to execution of the branch instruction. If the predicted instruction stream is correct (which is generally well in excess of 90% for many current designs), then the efficiency of instruction execution may be advantageously improved. However, if the predicted instruction stream is incorrect (i.e. one or more branch instructions are predicted incorrectly), then the instructions from the incorrectly predicted instruction stream are discarded from the instruction-processing pipeline and the efficiency of instruction execution may be degraded.

To be effective, the branch prediction mechanism must be highly accurate such that the predicted instruction stream is correct as often as possible. Frequently, a history of prior executions of a branch or branches is used to form a more accurate prediction for a particular branch. Such a branch prediction history typically requires maintaining data corresponding to the branch instruction in a storage.

Many branch prediction mechanisms have been implemented that yield relatively good results. One such branch prediction mechanism is the GShare branch prediction mechanism. The GShare mechanism combines a global branch history and several bits of the program counter (PC) of a current branch instruction (e.g., fetch address of the current branch instruction) to form an index into a predictor table. Each entry in the predictor table typically stores a counter value that may be indicative of whether a branch should be taken or not. Although the GShare mechanism may be an effective prediction mechanism, aliasing of index values is a concern. For example, the GShare mechanism may produce the same index value and therefore an erroneous. prediction, when provided with different input combinations of the PC and global branch history that correspond to different branches.

SUMMARY

Various embodiments of a branch prediction mechanism are disclosed. In one embodiment, the branch prediction mechanism may include a first storage including a first plurality of locations for storing a first set of partial prediction information. The branch prediction mechanism may also include a second storage including a second plurality of locations for storing a second set of partial prediction information. Further the branch prediction mechanism may include a control unit that performs a first hash function on input branch information to generate a first index for accessing a selected location within the first storage. In one particular implementation, the input branch information may include branch history information in addition to branch address information such as the fetch address of current branch instruction, for example. The control unit also performs a second hash function on the input branch information to generate a second index for accessing a selected location within the second storage. The control unit may further provide a prediction value based on corresponding partial prediction information in the selected locations of the first and the second storages.

Figure 1:
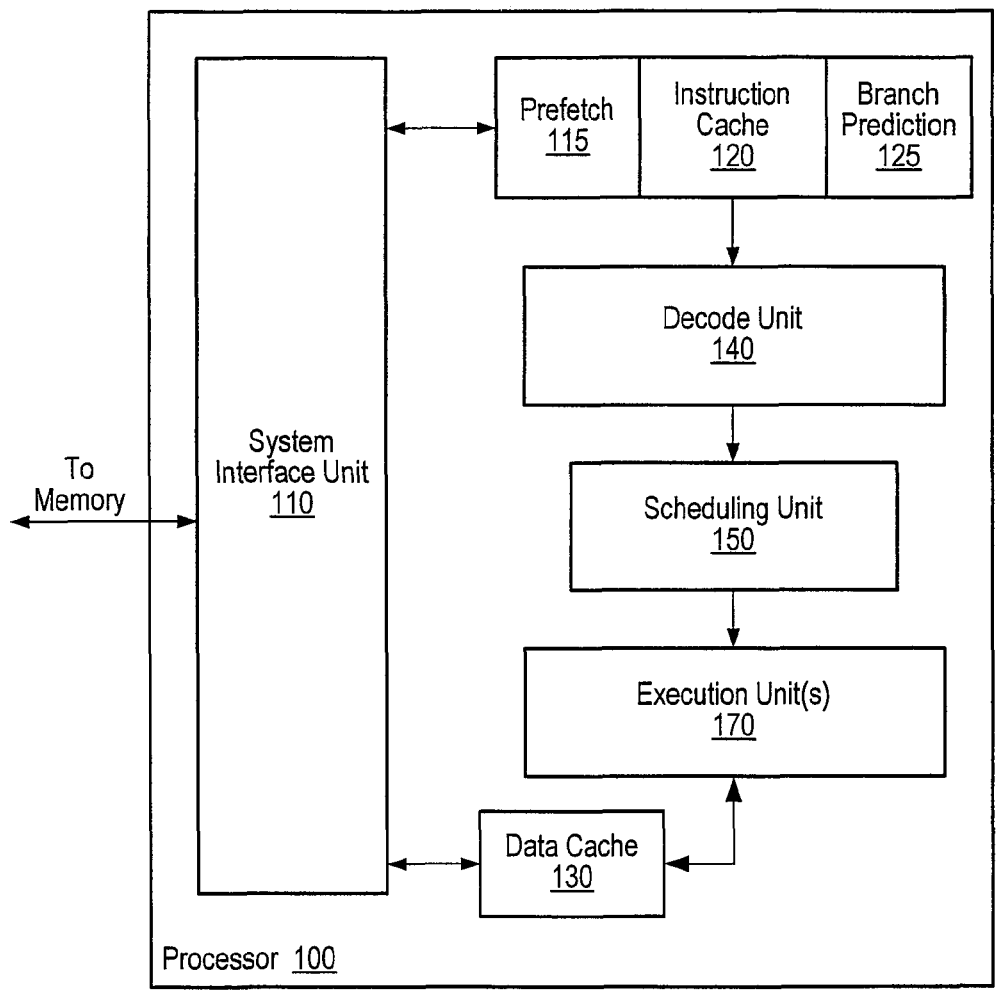
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a block diagram of one embodiment of a processor is shown. Processor 100 includes a system interface unit 110 coupled to a prefetch unit 115, an instruction cache 120, a branch prediction unit 125, and to a data cache 130. Processor 100 also includes a decode unit 140 coupled to the instruction cache 120 and to a scheduling unit 150. Further, execution unit(s) 170 is coupled to the scheduling unit 150 and the data cache 130.

It is noted that processor 100 may be representative of a processor in the SPARC™ family of processors. However, it is contemplated that in other embodiments, processor 100 may be representative of other types of processors such as a processor in the x86 family of processors, for example. It is further noted that processor 100 may include other functional blocks which are not shown for simplicity.

In the illustrated embodiment, system interface unit 110 is coupled to provide processor 100 with access to system resources. For example, prefetch unit 115 may be configured to prefetch instructions from a system memory (not shown) through system interface unit 110 and to temporarily store the instructions in instruction cache 120. Processor 100 may be configured to execute instructions in a pipelined manner. Thus, at least portions of decoding unit 140, scheduling unit 150 and execution unit(s) 170 may form the pipeline. In one embodiment, the instructions may be decoded by decoding unit 140 and sent to the scheduling unit 150. Scheduling unit 150 may be configured to schedule the decoded instructions for execution within execution unit(s) 170. In one embodiment, scheduling unit 150 may store the decoded instructions in an execution queue (not shown) in a particular execution order.

In one embodiment, execution unit(s) 170 may access the queue to retrieve the next instruction to execute. In addition, data cache 130 is configured to provide any necessary data to execution unit(s) 170 during execution. In one embodiment, processor 100 may be a superscalar processor. As such, execution unit(s) 170 may be an execution core including multiple integer execution units, multiple floating-point units, and a load/store unit, which are not shown for simplicity. However, it is contemplated that in other embodiments the execution unit(s) 170 may include a single integer execution unit and a single floating point unit.

In conjunction with instruction pre-fetching, branch prediction unit 125 may be configured to predict whether conditional branch instructions will be taken or not. More particularly, branch prediction unit 125 may use multiple hash functions (not shown in FIG. 1) to access selected locations within multiple respective predictor tables (not shown in FIG. 1). The predictor tables may be used to store partial prediction information. In the embodiment described below in the description of FIG. 2, the partial prediction information may be used to generate a prediction value for predicting whether a conditional branch instruction will be taken or not. Alternatively, in the embodiment described below in conjunction with the description of FIG. 3, the partial prediction information may be used to control whether a branch prediction is performed in accordance with a branch prediction hint encoded within a current branch instruction.

Figure 2:
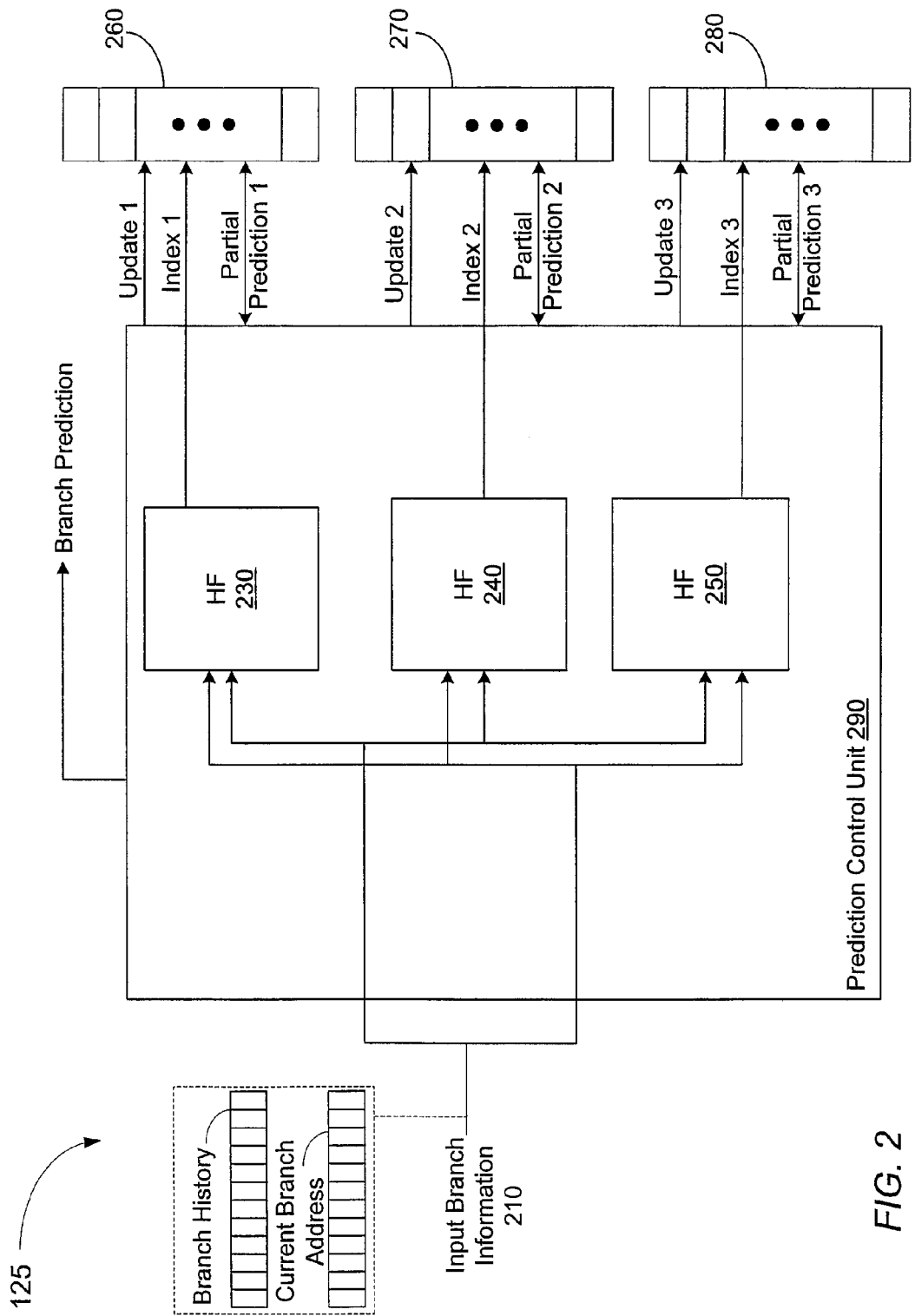
FIG. 2 is a block diagram of one embodiment of the branch prediction unit of the processor of FIG. 1.

Referring to FIG. 2, a block diagram of one embodiment of branch prediction unit 125 employing multiple hash functions is shown. Branch prediction unit 125 includes a prediction control unit 290 which includes hash function blocks 230, 240 and 250 that are coupled to receive input branch information 210 and to provide a branch prediction output. In addition, branch prediction unit 125 includes predictor storages 260, 270 and 280 that are coupled to hash function blocks 230, 240 and 250, respectively.

In one embodiment, input branch information 210 may include global branch history information and current branch address information. For example, the global branch history information may be a multi-bit history of previous branch instructions, which may or may not include unconditional branches. In one implementation, the global branch history may include a series of ones and zeros that are indicative of the previous branch instruction outcomes. For example, a logic one may indicate that a branch was taken and a logic zero may indicate that a branch was not taken, although it is contemplated that in other embodiments, a logic zero may indicate that a branch was taken and a logic one may indicate that a branch was not taken. In one embodiment, the global branch history may be stored within a storage structure (not shown) such as an array.

In one implementation, the current branch address information may include some number of bits of the fetch address of the current branch instruction, for example. It is noted that when referring to the fetch address, some architectures refer to the address referenced by the program counter (PC), while others may refer to the address referenced by the instruction pointer (EIP). Further, depending on the system architecture, the fetch address may or may not be translated into a physical address. Thus, as used herein, the fetch address of the current branch instruction simply refers to the address used to locate the current branch instruction in memory. As such, in implementations that use address translation, the fetch address may be either virtual or physical. It is noted that in other embodiments, other branch information associated with the current branch instruction may be used.

In the illustrated embodiment, hash function blocks 230, 240 and 250 may each be configured to operate on input branch information 210 to generate a corresponding index (e.g., index 1, 2 and 3) for accessing a respective one of predictor storages 260, 270 and 280. For example, in one embodiment, hash function 230 may operate on all or part of the input branch information 210 including the global branch history and the fetch address information to generate index value 1 for accessing predictor storage 260. Likewise, hash function 240 and 250 may operate on all or part of the input branch information to generate index values 2 and 3 for accessing predictor storages 270 and 280, respectively. It is noted that each of hash function blocks 230, 240 and 250 may implement any of a variety of particular functions to generate an index value. For example, in one embodiment, hash function block 230 may perform an Exclusive-OR (XOR) function on one portion of the global branch information and one portion of the fetch address information. Hash function block 240 may likewise perform an XOR function on another portion of the global branch information and another portion of the fetch address information, and hash function 250 may perform an XOR function on yet another portion of the global branch information and another portion of the fetch address information.

In one embodiment, each location in a given predictor storage may store partial prediction information indicative of whether the current branch instruction will be taken or not taken. For example, the partial prediction information may indicate strongly/weakly taken/not taken. In one embodiment, the partial prediction information may be represented by a two-bit saturating count value that ranges from zero to three. In such an embodiment, when a selected location within each of predictor storages 260, 270 and 280 is indexed, the corresponding partial prediction values are read by prediction control unit 290. Prediction control unit 290 is configured to provide a prediction value that indicates strongly/weakly taken/not taken for predicting whether the current branch will be taken or not taken based upon the three partial prediction values corresponding to the selected locations. In one embodiment, prediction control unit 290 may be configured to sum the three count values. For example, the sum may range from zero through nine. In one embodiment, a sum of zero through two may be indicative of a strongly not taken branch while a sum of three through four may be indicative of a weakly not taken branch. A sum of five through seven may be indicative of a weakly taken branch while a sum of eight through nine may be indicative of a strongly taken branch. However, it is contemplated that the delineations between taken and not taken may be made using any suitable scale. It is noted however, that the actual range of prediction values that are indicative of strongly/weakly taken/not taken may be different. Using this prediction value, prediction control unit 290 may provide a branch prediction.

After each prediction is made, prediction control unit 290 may be configured to update one or more of the selected locations of predictor storages 260, 270 and 280 that were used to make the last prediction. The update is dependent upon whether the prediction was accurate or not. For example, in one embodiment, if prediction control unit 290 was accurate in predicting that the branch will not be taken, a non-zero count value in the current entry of one or more of predictor storages 260, 270 and 280 may be decremented. In addition, if prediction control unit 290 was accurate in predicting that the branch will be taken, the count value in the current entry of one or more of predictor storages 260, 270 and 280 is incremented, unless a count value is already saturated at three. It is noted that in one embodiment, during an update, only one of the current predictor storage count values may be selected at random to be updated. In another embodiment, all three current predictor storage count values may be updated. In yet another embodiment, any number of the predictor storage count values may be updated dependent upon an update algorithm as desired.

In another embodiment, the partial prediction information stored within storages 260, 270, and 280 may indicate taken or not taken and may be represented by a one-bit count value that is either zero or one. In such an embodiment, when a selected location within each of predictor storages 260, 270 and 280 is indexed, the corresponding partial prediction values are read by prediction control unit 290. Prediction control unit 290 is configured to provide a prediction value that indicates strongly/weakly taken/not taken for predicting whether the current branch will be taken or not taken based upon the three partial prediction values corresponding to the selected locations. Prediction control unit 290 may be configured to use the three partial prediction values as a unary number representation by summing the number of ones from the three partial prediction values. For example, the unary number may range from zero to three and may represent a prediction value indicative of strongly/weakly taken/not taken. In one embodiment, a zero value may be indicative of a strongly not taken branch while a sum of one may be indicative of a weakly not taken branch. A sum of two may be indicative of a weakly taken branch while a sum of three may be indicative of a strongly taken branch. It is noted however, that the actual prediction value that is indicative of strongly/weakly taken/not taken may be different. Using this prediction value, prediction control unit 290 may provide a branch prediction.

In some processor architectures, the instruction set supports the use of hint-based branch prediction. In such branch prediction schemes, conditional branch instructions may include a hint bit or bias bit that is indicative of whether the compiler has statically determined whether the branch will be taken or not taken. As will be described in greater detail below, multiple partial prediction values may be used to control whether a branch prediction is performed in accordance with a branch prediction hint encoded within a current branch instruction.

Figure 3:
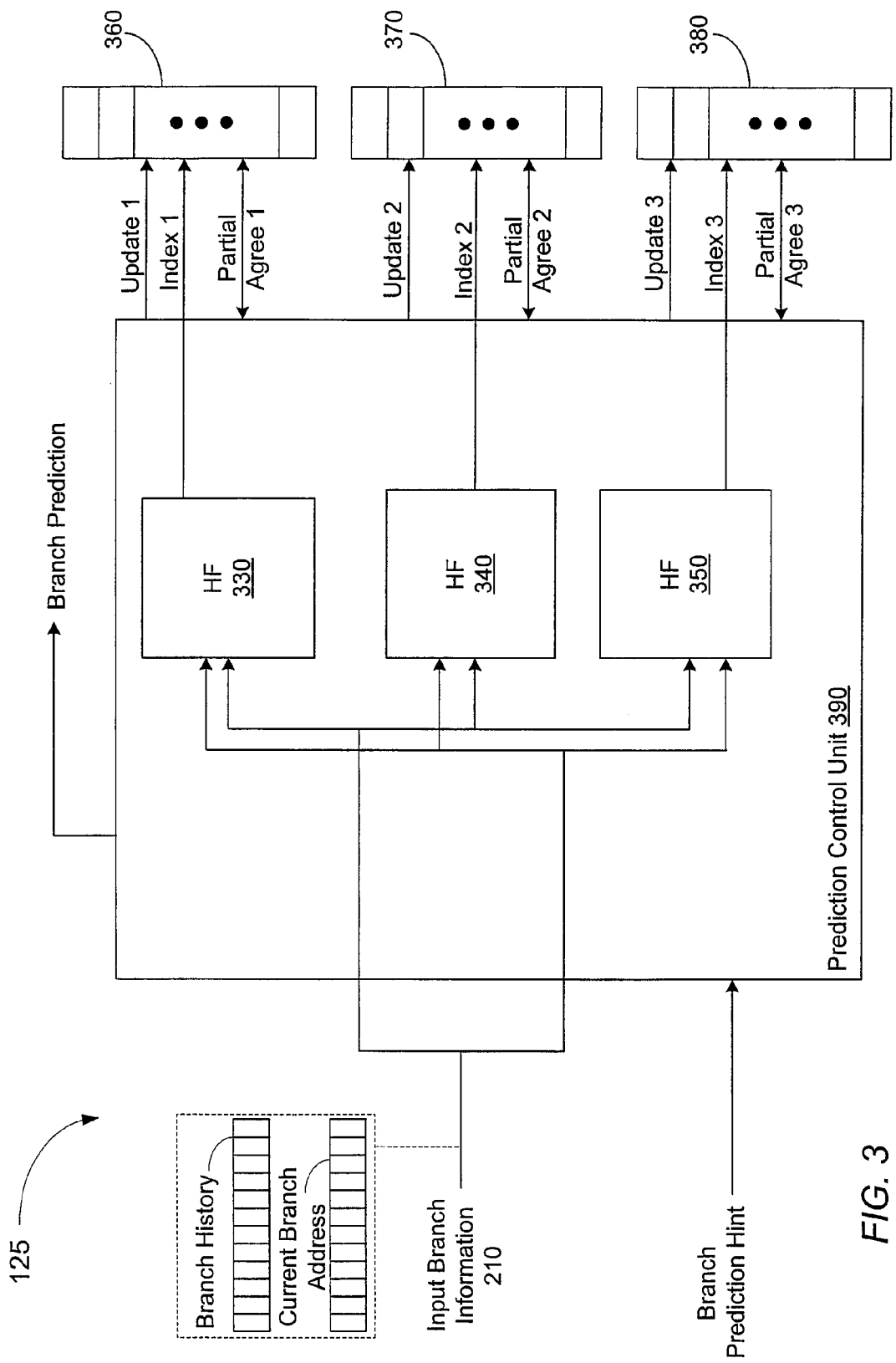
FIG. 3 is a block diagram of another embodiment of the branch prediction unit of the processor of FIG. 1.

Turning to FIG. 3, a block diagram of another embodiment of branch prediction unit 125 is shown. Components that correspond to those illustrated in FIG. 1-FIG. 2 are numbered identically for clarity and simplicity. Branch prediction unit 125 includes a prediction control unit 390 which includes hash function blocks 330, 340 and 350 that are coupled to receive input branch information 210. In addition, branch prediction unit 125 includes predictor storages 360, 370 and 380 that are coupled to hash function blocks 330, 340 and 350, respectively. Prediction control unit 390 is also coupled to receive a branch prediction hint corresponding to a branch prediction hint bit associated with a current branch instruction. Prediction control unit 390 is further coupled to provide a branch prediction.

In one embodiment, hash function blocks 330, 340 and 350 may each be configured to operate on the input branch information 210 to generate index values for accessing selected locations within predictor storages 360, 370, and 380, respectively. It is noted that hash function blocks 330, 340 and 350 may include functionality similar to hash function blocks 230, 240 and 250 of FIG. 2.

In the illustrated embodiment, the partial prediction information stored within storages 360, 370, and 380 may be indicative of whether a branch prediction is performed in accordance with a branch prediction hint bit by prediction control unit 390. This partial prediction information may also be referred to as partial agree prediction information. Thus, the prediction information stored in each of storages 360, 370, and 380 may be referred to as a partial agree predictor. Each partial agree predictor may be represented by a two-bit saturating count value that ranges from zero to three.

In one embodiment, when a selected location within each of predictor storages 360, 370 and 380 is indexed, the corresponding partial prediction values are read by prediction control unit 390. Prediction control unit 390 is configured to provide a prediction value that indicates strongly/weakly agree/disagree for controlling whether a branch prediction is performed in accordance with a branch prediction hint bit based upon the three partial prediction values corresponding to the selected locations. In one embodiment, prediction control unit 390 may be configured to sum the three count values. For example, the sum may range from zero through nine. In one embodiment, a sum of zero through two may be indicative of a strongly disagree with the hint while a sum of three through four may be indicative of a weakly disagree with the hint. A sum of five through seven may be indicative of a weakly agree with the hint while a sum of eight through nine may be indicative of a strongly agree with the hint. However, it is contemplated that the delineations between agree and disagree may be made using any suitable scale. It is noted however, that the actual range of prediction values that are indicative of strongly/weakly agree/disagree may be different. Using this prediction value, prediction control unit 390 may provide a branch prediction.

It is noted that, similar to the embodiment described above in conjunction with the description of FIG. 2, the partial prediction values (e.g., the two-bit counters) may be updated after a prediction by either incrementing or decrementing one or more of the count values dependent on the accuracy of the prediction.

In another embodiment, the partial prediction information stored within storages 360, 370, and 380 may indicate agree or disagree and may be represented by a one-bit count value that is either one or zero, respectively. In such an embodiment, when a selected location within each of predictor storages 360, 370 and 380 is indexed, the corresponding partial prediction values are read by prediction control unit 390. Prediction control unit 390 is configured to provide a prediction value that indicates strongly/weakly agree/disagree for controlling whether a branch prediction is performed in accordance with a branch prediction hint bit based upon the three partial prediction values corresponding to the selected locations. Prediction control unit 390 may be configured to use the three partial prediction values as a unary number representation by summing the number of ones from the three partial prediction values. For example, the unary number may range from zero to three and may represent a prediction value indicative of strongly/weakly agree/disagree. In one embodiment, a zero value may be indicative of strongly disagree with the hint while a sum of one may be indicative of weakly disagree with the hint. A sum of two may be indicative of a weakly agree with the hint while a sum of three may be indicative of a strongly agree with the hint. It is noted however, that the actual prediction value that is indicative of strongly/weakly agree/disagree may be different. Using this prediction value, prediction control unit 390 may provide a branch prediction.

It is noted that although the embodiments described above in conjunction with the descriptions of FIG. 2 and FIG. 3 are shown with three hash functions and three corresponding predictor storages, it is contemplated that other embodiments may include any number of hash functions for accessing any number of corresponding predictor storages.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A branch prediction mechanism comprising:
a plurality of storages, each configured to store a respective set of partial prediction information;
a control unit configured to generate a plurality of index values, wherein each index value corresponds to a selected location within a respective storage of the plurality of storages, wherein the control unit is configured to perform a plurality of separate hash functions, each separate hash function operating on a respective portion of input branch information to generate a respective one of the index values;
wherein the control unit is further configured to sum together the partial prediction information in the selected locations of the storages to generate a branch prediction value.

2. The branch prediction mechanism as recited in claim 1, wherein the branch prediction value provides a strongly/weakly taken/not taken branch prediction indication that is indicative of whether the current branch instruction is taken upon execution.

3. The branch prediction mechanism as recited in claim 1, wherein the input branch information includes: branch history information corresponding to an outcome of a number of preceding branch instructions, and address information corresponding to a fetch address of a current branch instruction.

4. The branch prediction mechanism as recited in claim 3, wherein each hash function is configured to operate on a separate portion of the branch history information.

5. The branch prediction mechanism as recited in claim 3, wherein each hash function is configured to operate on a different subset of bits of the fetch address.

6. The branch prediction mechanism as recited in claim 1, wherein the control unit is further configured to update the selected locations of the storages dependent on whether the branch prediction value yields an accurate branch prediction.

7. The branch prediction mechanism as recited in claim 1, wherein each respective set of partial prediction information includes a plurality of counter values, each counter value corresponding to a strongly/weakly taken/not taken branch prediction indication that is indicative of whether the current branch instruction is taken upon execution.

8. The branch prediction mechanism as recited in claim 1, wherein the control unit is further configured to receive a branch prediction hint encoded within the current branch instruction, and to use the branch prediction value to determine whether to use the branch prediction hint.

9. A method comprising:
a control unit receiving input branch information;
the control unit storing a respective set of partial prediction information within a plurality of storages;
the control unit generating a plurality of index values, wherein each index value corresponds to a selected location within a respective storage of the plurality of storages;
the control unit performing a plurality of separate hash functions, each separate hash function operating on a respective portion of the input branch information to generate a respective one of the index values;
the control unit summing together the partial prediction information in the selected locations of the storages to generate a branch prediction value.

10. The method as recited in claim 9, wherein the prediction value provides a strongly/weakly taken/not taken branch prediction indication that is indicative of whether the current branch instruction is taken upon execution.

11. The method as recited in claim 9, wherein the input branch information includes: branch history information corresponding to an outcome of a number of preceding branch instructions, and address information corresponding to a fetch address of a current branch instruction.

12. The method as recited in claim 11, further comprising each hash function operating on a separate portion of the branch history information.

13. The method as recited in claim 11, further comprising each hash function operating on a different subset of bits of the fetch address.

14. The method as recited in claim 9, further comprising the control unit updating the selected locations of the storages dependent on whether the branch prediction value yields an accurate branch prediction.

15. The method as recited in claim 9, wherein each of the first and the second sets of partial prediction information includes a plurality of counter values each corresponding to a strongly/weakly taken/not taken branch prediction indication that is indicative of whether the current branch instruction is taken upon execution.

16. The method as recited in claim 9, wherein each respective set of partial prediction information includes a plurality of counter values, each counter value corresponding to a strongly/weakly taken/not taken branch prediction indication that is indicative of whether the current branch instruction is taken upon execution.

17. The method as recited in claim 9, further comprising the control unit receiving a branch prediction hint encoded within the current branch instruction, and using the branch prediction value to determine whether to use the branch prediction hint.

18. The method as recited in claim 17, each respective set of partial prediction information includes a plurality of counter values each corresponding to a strongly/weakly agree/disagree indication that is indicative of whether the branch prediction hint bit embedded within the current branch instruction is to be used by the control unit.

19. A branch prediction mechanism comprising:
  means for receiving input branch information;
  means for storing a respective set of partial prediction information within a plurality of storages;
  means for generating a plurality of index values, wherein each index value corresponds to a selected location within a respective storage of the plurality of storages;
  means for performing a plurality of separate hash functions, each separate hash function operating on a respective portion of the input branch information to generate a respective one of the index values;
  means for summing together the partial prediction information in the selected locations of the storages to generate a branch prediction value that is indicative of whether the current branch instruction is taken upon execution.

20. The branch prediction mechanism as recited in claim 19, wherein the input branch information includes: branch history information corresponding to an outcome of a number of preceding branch instructions, and address information corresponding to a fetch address of a current branch instruction.

* * * * *